(12) United States Patent
Kim et al.

(10) Patent No.: US 10,890,916 B2
(45) Date of Patent: Jan. 12, 2021

(54) LOCATION-SPECIFIC ALGORITHM SELECTION FOR OPTIMIZED AUTONOMOUS DRIVING

(71) Applicant: STRADVISION, INC., Pohang-si (KR)

(72) Inventors: Kye-Hyeon Kim, Seoul (KR); Yongjoong Kim, Pohang-si (KR); Hak-Kyoung Kim, Pohang-si (KR); Woonhyun Nam, Pohang-si (KR); SukHoon Boo, Anyang-si (KR); Myungchul Sung, Pohang-si (KR); Dongsoo Shin, Suwon-si (KR); Donghun Yeo, Pohang-si (KR); Wooju Ryu, Pohang-si (KR); Myeong-Chun Lee, Pohang-si (KR); Hyungsoo Lee, Seoul (KR); Taewoong Jang, Seoul (KR); Kyungjoong Jeong, Pohang-si (KR); Hongmo Je, Pohang-si (KR); Hojin Cho, Pohang-si (KR)

(73) Assignee: STRADVISION, INC., Pohang-si (KR)

( * ) Notice: Subject to any disclaimer, the term of this patent is extended or adjusted under 35 U.S.C. 154(b) by 0 days.

(21) Appl. No.: 16/731,083

(22) Filed: Dec. 31, 2019

(65) Prior Publication Data

US 2020/0241544 A1   Jul. 30, 2020

Related U.S. Application Data

(60) Provisional application No. 62/798,821, filed on Jan. 30, 2019.

(51) Int. Cl.
*G05D 1/00* (2006.01)
*G05D 1/02* (2020.01)
(Continued)

(52) U.S. Cl.
CPC .......... *G05D 1/0221* (2013.01); *B60W 50/085* (2013.01); *G05D 1/0219* (2013.01); *G05D 1/0278* (2013.01); *G06N 3/08* (2013.01)

(58) Field of Classification Search
CPC .................................................. G05D 1/0221
See application file for complete search history.

(56) References Cited

U.S. PATENT DOCUMENTS

10,007,269 B1   6/2018   Gray
10,007,865 B1 *  6/2018   Kim ..................... G06K 9/6231
(Continued)

*Primary Examiner* — Truc M Do
(74) *Attorney, Agent, or Firm* — Xsensus LLP (57) ABSTRACT

A learning method for performing a seamless parameter switch by using a location-specific algorithm selection for an optimized autonomous driving is provided. And the method includes steps of: (a) a learning device instructing a K-th convolutional layer to apply a convolution operation to K-th training images, to thereby generate K-th feature maps; (b) the learning device instructing a K-th output layer to apply a K-th output operation to the K-th feature maps, to thereby generate K-th estimated autonomous driving source information; (c) the learning device instructing a K-th loss layer to generate a K-th loss by using the K-th estimated autonomous driving source information and its corresponding GT, and then to perform backpropagation by using the K-th loss, to thereby learn K-th parameters of the K-th CNN; and (d) the learning device storing the K-th CNN in a database after tagging K-th location information to the K-th CNN.

30 Claims, 5 Drawing Sheets

(51) Int. Cl.
*B60W 50/08* (2020.01)
*G06N 3/08* (2006.01)

(56) References Cited

U.S. PATENT DOCUMENTS

| | | | | |
|---|---|---|---|---|
| 10,089,743 | B1* | 10/2018 | Kim | G06T 7/11 |
| 10,095,977 | B1* | 10/2018 | Kim | G06N 3/0454 |
| 10,108,850 | B1* | 10/2018 | Das | G06K 9/00885 |
| 10,176,388 | B1* | 1/2019 | Ghafarianzadeh | G06K 9/00671 |
| 10,192,113 | B1* | 1/2019 | Liu | G06K 9/00791 |
| 10,242,665 | B1* | 3/2019 | Abeloe | G10L 13/047 |
| 10,311,578 | B1* | 6/2019 | Kim | G06K 9/34 |
| 10,390,003 | B1* | 8/2019 | Liu | G06T 7/246 |
| 10,496,104 | B1* | 12/2019 | Liu | G01S 19/14 |
| 2017/0243083 | A1* | 8/2017 | Wang | G06K 9/00711 |
| 2018/0239969 | A1 | 8/2018 | Lakehal-ayat et al. | |
| 2019/0004533 | A1 | 1/2019 | Huang et al. | |
| 2019/0147234 | A1* | 5/2019 | Kicanaoglu | G06K 9/00214 382/218 |
| 2019/0147602 | A1* | 5/2019 | Tao | G06T 7/248 382/103 |
| 2019/0156485 | A1* | 5/2019 | Pfeiffer | G06K 9/00791 |
| 2019/0361454 | A1* | 11/2019 | Zeng | G05D 1/0274 |

\* cited by examiner

LOCATION-SPECIFIC ALGORITHM SELECTION FOR OPTIMIZED AUTONOMOUS DRIVING

CROSS REFERENCE OF RELATED APPLICATION

This application claims the benefit of priority to U.S. Provisional Patent Application No. 62/798,821, filed Jan. 30, 2019, the entire contents of which are incorporated herein by reference.

FIELD OF THE DISCLOSURE

The present disclosure relates to a method and a device for use with an autonomous vehicle; and more particularly, to the method and the device for a seamless parameter switch by using a location-specific algorithm selection to achieve an optimized autonomous driving in each of regions.

BACKGROUND OF THE DISCLOSURE

Deep Convolutional Neural Network, or Deep CNN is the most core of the remarkable development in the field of Deep Learning. Though the CNN has been employed to solve character recognition problems in 1990s, it is not until recently that the CNN has become widespread in Machine Learning. For example, in 2012, the CNN significantly outperformed its competitors in an annual software contest, the ImageNet Large Scale Visual Recognition Challenge, and won the contest. After that, the CNN has become a very useful tool in the field of machine learning.

Such CNNs have been widely used in a field of an autonomous driving. In the field of the autonomous driving, the CNNs may perform an object detection, a free space detection and a semantic segmentation.

An obstacle of using such CNNs in the field thereof is that much computing powers are required to perform enormous amounts of convolution operations. Specifically, the CNNs may not function properly due to limited computing powers of the autonomous vehicle.

SUMMARY OF THE DISCLOSURE

It is an object of the present disclosure to solve all the aforementioned problems.

It is another object of the present disclosure to provide a method for a seamless parameter switch by using a location-specific algorithm selection to achieve an optimized autonomous driving in each of regions.

It is still another object of the present disclosure to provide the method for the seamless parameter switch by using the location-specific algorithm selection to achieve the optimized autonomous driving in each of the regions, to thereby allow Convolutional Neural Networks (CNNs) to consume less computing resources.

It is still yet another object of the present disclosure to provide the method for the seamless parameter switch by using the location-specific algorithm selection to achieve the optimized autonomous driving in each of the regions, to thereby allow the CNNs to perform more properly.

It is still yet another object of the present disclosure to provide the method for the seamless parameter switch by using a time-specific algorithm selection to achieve the optimized autonomous driving in each of the regions, to thereby use each of optimized CNNs for each of time ranges.

In accordance with one aspect of the present disclosure, there is provided a learning method for performing a seamless parameter switch by using a location-specific algorithm selection, to thereby allow a subject vehicle to perform an optimized autonomous driving in each of regions, including steps of: (a) a learning device, if one or more K-th training images corresponding to at least one K-th region are acquired, instructing at least one K-th convolutional layer of a K-th Convolutional Neural Network (CNN) included therein to apply at least one K-th convolution operation to the K-th training images, to thereby generate one or more K-th feature maps; (b) the learning device instructing at least one K-th output layer of the K-th CNN to apply at least one K-th output operation to the K-th feature maps, to thereby generate one or more pieces of K-th estimated autonomous driving source information; (c) the learning device instructing at least one K-th loss layer of the K-th CNN to generate at least one K-th loss by using the K-th estimated autonomous driving source information and its corresponding K-th Ground-Truth (GT) autonomous driving source information, and then to perform backpropagation by using the K-th loss, to thereby learn at least part of K-th parameters of the K-th CNN; and (d) the learning device storing the K-th CNN in a database after tagging K-th location information of the K-th region to the K-th CNN, wherein the K-th CNN is one of a first CNN to an M-th CNN, and wherein M is an integer larger than 1, and K is an integer from 1 to M.

As an example, the method further includes steps of: (e) the learning device (i) acquiring information on each of a (K_1)-st CNN to a (K_N)-th CNN, selected among the first CNN to the M-th CNN, corresponding to each of a (K_1)-st region to a (K_N)-th region whose distance from the K-th region is smaller than a first threshold, and then (ii) calculating similarity scores including a (K_1)-st similarity score between the K-th parameters and (K_1)-st parameters of the (K_1)-st CNN to a (K_N)-th similarity score between the K-th parameters and (K_N)-th parameters of the (K_N)-th CNN; and (f) the learning device generating a K-th representative CNN corresponding to a K-th extensive region including the K-th region by referring to at least part of (i) one or more specific CNNs, among the (K_1)-st CNN to the (K_N)-th CNN, whose similarity scores are larger than a second threshold and (ii) the K-th CNN, and wherein N is an integer larger than 0.

As one example, at the step of (e), the learning device calculates the (K_1)-st similarity score to the (K_N)-th similarity score by referring to a following formula:

$$S_{K\_Q} = \sum_l |P_{K_l} - P_{(K\_Q)_l}|^2$$

wherein $S_{K\_Q}$ denotes a (K_Q)-th similarity score among the (K_1)-st similarity score to the (K_N)-th similarity score, $P_{K_l}$ denotes an l-th component parameter of the K-th parameters, and $P_{(K\_Q)_l}$ denotes an l-th component parameter of (K_Q)-th parameters of a (K_Q)-th CNN corresponding to the (K_Q)-th similarity score, wherein Q is an integer from 1 to N.

As one example, at the step of (f), the learning device calculates each of averages for each of component parameters, corresponding to each of relative same positions, among all parameters in each of the specific CNNs and the K-th CNN, to thereby generate the K-th representative CNN which includes said averages as its parameters.

As one example, each of regions in the K-th extensive region has one or more common characteristics thereamong, wherein the common characteristics include at least part of topographical characteristics, climatic characteristics and building arrangement characteristics.

As one example, at the step of (a), the learning device instructs each of one or more K-th convolutional neurons in the K-th convolutional layer to repeat processes of applying at least one convolution operation to its inputted value and then delivering its outputted value to its next K-th convolutional neuron, to thereby apply the K-th convolution operation to the K-th training images.

As one example, at the step of (b), the learning device instructs the K-th output layer which has been built as a K-th deconvolutional layer corresponding to the K-th convolutional layer, to apply the K-th output operation which corresponds to a K-th deconvolution operation, to the K-th feature maps, to thereby generate the K-th estimated autonomous driving source information including information on K-th estimated segmentation images corresponding to the K-th training images.

As one example, at the step of (b), the learning device instructs the K-th output layer which has been built as a K-th Fully-Connected (FC) layer, to apply the K-th output operation which corresponds to a K-th FC network operation, to the K-th feature maps, to thereby generate the K-th estimated autonomous driving source information including information on K-th estimated object detection results corresponding to the K-th training images.

As one example, at the step of (d), the learning device (i) stores the K-th CNN in the database after tagging the K-th location information along with K-th time information, the K-th time information corresponding to a K-th timing when the K-th training images have been acquired, to the K-th CNN, (ii) acquires information on each of a (K_1)-st CNN to a (K_N)-th CNN, selected among the first CNN to the M-th CNN, corresponding to each of a (K_1)-st timing to a (K_N)-th timing whose differences from the K-th timing are smaller than a third threshold, (iii) calculates similarity scores including a (K_1)-st similarity score between the K-th parameters and (K_1)-st parameters of the (K_1)-st CNN to a (K_N)-th similarity score between the K-th parameters and (K_N)-th parameters of the (K_N)-th CNN, and (iv) generates a K-th representative CNN corresponding to a K-th time range including the K-th timing by referring to at least part of (i) one or more specific CNNs, among the (K_1)-st CNN to the (K_N)-th CNN, whose similarity scores are larger than a fourth threshold and (ii) the K-th CNN.

In accordance with another aspect of the present disclosure, there is provided a testing method for performing a seamless parameter switch by using a location-specific algorithm selection, to thereby allow a subject vehicle to perform an optimized autonomous driving in each of regions, including steps of: (a) on condition that (1) a learning device, if one or more K-th training images corresponding to at least one K-th region are acquired, has instructed at least one K-th convolutional layer of a K-th Convolutional Neural Network (CNN) included therein to apply at least one K-th convolution operation to the K-th training images, to thereby generate one or more K-th feature maps for training, (2) the learning device has instructed at least one K-th output layer of the K-th CNN to apply at least one K-th output operation to the K-th feature maps for training, to thereby generate one or more pieces of K-th estimated autonomous driving source information for training, (3) the learning device has instructed at least one K-th loss layer of the K-th CNN to generate at least one K-th loss by using the K-th estimated autonomous driving source information for training and its corresponding K-th Ground-Truth (GT) autonomous driving source information, and then to perform backpropagation by using the K-th loss, to thereby learn at least part of K-th parameters of the K-th CNN, and (4) the learning device has stored the K-th CNN in a database after tagging K-th location information of the K-th region to the K-th CNN, wherein the K-th CNN is one of a first CNN to an M-th CNN, and wherein M is an integer larger than 1, and K is an integer from 1 to M, a testing device instructing the K-th CNN corresponding to the K-th region including the subject vehicle at a K-th timing to generate K-th estimated autonomous driving source information for testing by using a K-th test image; and (b) the testing device instructing an autonomous driving module to perform an autonomous driving of the subject vehicle by referring to the K-th estimated autonomous driving source information for testing.

As one example, at the step of (a), the testing device acquires a K-th representative CNN for a K-th extensive region including the K-th region, and then instructs the K-th representative CNN to generate the K-th estimated autonomous driving source information for testing.

As one example, before performing a process of generating the K-th estimated autonomous driving source information for testing at the step of (a), the method further includes steps of: (a1) the testing device, if the subject vehicle is located in a (K−1)-th region which is adjacent to the K-th region at a (K−1)-th timing which is earlier than the K-th timing, monitoring whether the subject vehicle has moved from a (K−1) 1-st partial region in the (K−1)-th region to a (K−1)_2-nd partial region therein or not, by referring to subject location information acquired from a Global Positioning System (GPS) in the subject vehicle; and (a2) the testing device, if a movement of the subject vehicle from the (K−1)_1-th partial region to the (K−1)_2-nd partial region has been detected, acquiring the K-th CNN corresponding to the K-th region where the subject vehicle is to be located at the K-th timing by referring to an estimated route of the subject vehicle.

As one example, at the step of (a2), (i) the testing device acquires information on the estimated route from the autonomous driving module, if the subject vehicle has been performing the autonomous driving at a timing when the subject vehicle has moved to the (K−1)_2-nd partial region, and (ii) the testing device acquires the information on the estimated route from an Advanced Driving Assistance System (ADAS) in the subject vehicle if the subject vehicle has been performing a semi-autonomous driving at the timing when the subject vehicle has moved to the (K−1)_2-nd partial region and its destination has been inputted to the ADAS.

As one example, at the step of (a2), the testing device, if the subject vehicle has been performing a manual driving at a timing when the subject vehicle has moved to the (K−1)_2-nd partial region or if the subject vehicle has been performing a semi-autonomous driving but its destination has not been inputted to an ADAS in the subject vehicle, performs an inverse reinforcement learning algorithm by using information on a past route which had been driven by the subject vehicle in a time range from a (K−P)-th timing to the (K−1)-th timing, to thereby acquire the estimated route, wherein P is an integer from 1 to T−1.

As one example, at the step of (a), the testing device, if each of the first to the M-th CNNs is stored in the database with its information, tagged thereto, on each of locations where its corresponding training images have been acquired and each of timings when said its corresponding training images have been acquired, instructs the K-th CNN which corresponds to both of the K-th region and a K-th time range including the K-th timing to generate the K-th estimated autonomous driving source information for testing.

In accordance with still another aspect of the present disclosure, there is provided a learning device for performing a seamless parameter switch by using a location-specific algorithm selection, to thereby allow a subject vehicle to perform an optimized autonomous driving in each of regions, including: at least one memory that stores instructions; and at least one processor configured to execute the instructions to perform processes of: (I) if one or more K-th training images corresponding to at least one K-th region are acquired, instructing at least one K-th convolutional layer of a K-th Convolutional Neural Network (CNN) included therein to apply at least one K-th convolution operation to the K-th training images, to thereby generate one or more K-th feature maps, (II) instructing at least one K-th output layer of the K-th CNN to apply at least one K-th output operation to the K-th feature maps, to thereby generate one or more pieces of K-th estimated autonomous driving source information, (III) instructing at least one K-th loss layer of the K-th CNN to generate at least one K-th loss by using the K-th estimated autonomous driving source information and its corresponding K-th Ground-Truth (GT) autonomous driving source information, and then to perform backpropagation by using the K-th loss, to thereby learn at least part of K-th parameters of the K-th CNN, and (IV) storing the K-th CNN in a database after tagging K-th location information of the K-th region to the K-th CNN, wherein the K-th CNN is one of a first CNN to an M-th CNN, and wherein M is an integer larger than 1, and K is an integer from 1 to M.

As one example, the processor further performs processes of: (V) (i) acquiring information on each of a (K_1)-st CNN to a (K_N)-th CNN, selected among the first CNN to the M-th CNN, corresponding to each of a (K_1)-st region to a (K_N)-th region whose distance from the K-th region is smaller than a first threshold, and then (ii) calculating similarity scores including a (K_1)-st similarity score between the K-th parameters and (K_1)-st parameters of the (K_1)-st CNN to a (K_N)-th similarity score between the K-th parameters and (K_N)-th parameters of the (K_N)-th CNN, and (VI) generating a K-th representative CNN corresponding to a K-th extensive region including the K-th region by referring to at least part of (i) one or more specific CNNs, among the (K_1)-st CNN to the (K_N)-th CNN, whose similarity scores are larger than a second threshold and (ii) the K-th CNN, and wherein N is an integer larger than 0.

As one example, at the process of (V), the processor calculates the (K_1)-st similarity score to the (K_N)-th similarity score by referring to a following formula:

$$S_{K\_Q} = \sum_l |P_{K_l} - P_{(K\_Q)_l}|^2$$

wherein $S_{K\_Q}$ denotes a (K_Q)-th similarity score among the (K_1)-st similarity score to the (K_N)-th similarity score, $P_{K_l}$ denotes an l-th component parameter of the K-th parameters, and $P_{(K\_Q)_l}$ denotes an l-th component parameter of (K_Q)-th parameters of a (K_Q)-th CNN corresponding to the (K_Q)-th similarity score, wherein Q is an integer from 1 to N.

As one example, at the process of (VI), the processor calculates each of averages for each of component parameters, corresponding to each of relative same positions, among all parameters in each of the specific CNNs and the K-th CNN, to thereby generate the K-th representative CNN which includes said averages as its parameters.

As one example, each of regions in the K-th extensive region has one or more common characteristics thereamong, wherein the common characteristics include at least part of topographical characteristics, climatic characteristics and building arrangement characteristics.

As one example, at the process of (I), the processor instructs each of one or more K-th convolutional neurons in the K-th convolutional layer to repeat processes of applying at least one convolution operation to its inputted value and then delivering its outputted value to its next K-th convolutional neuron, to thereby apply the K-th convolution operation to the K-th training images.

As one example, at the process of (II), the processor instructs the K-th output layer which has been built as a K-th deconvolutional layer corresponding to the K-th convolutional layer, to apply the K-th output operation which corresponds to a K-th deconvolution operation, to the K-th feature maps, to thereby generate the K-th estimated autonomous driving source information including information on K-th estimated segmentation images corresponding to the K-th training images.

As one example, at the process of (II), the processor instructs the K-th output layer which has been built as a K-th Fully-Connected (FC) layer, to apply the K-th output operation which corresponds to a K-th FC network operation, to the K-th feature maps, to thereby generate the K-th estimated autonomous driving source information including information on K-th estimated object detection results corresponding to the K-th training images.

As one example, at the process of (IV), the processor (i) stores the K-th CNN in the database after tagging the K-th location information along with K-th time information, the K-th time information corresponding to a K-th timing when the K-th training images have been acquired, to the K-th CNN, (ii) acquires information on each of a (K_1)-st CNN to a (K_N)-th CNN, selected among the first CNN to the M-th CNN, corresponding to each of a (K_1)-st timing to a (K_N)-th timing whose differences from the K-th timing are smaller than a third threshold, (iii) calculates similarity scores including a (K_1)-st similarity score between the K-th parameters and (K_1)-st parameters of the (K_1)-st CNN to a (K_N)-th similarity score between the K-th parameters and (K_N)-th parameters of the (K_N)-th CNN, and (iv) generates a K-th representative CNN corresponding to a K-th time range including the K-th timing by referring to at least part of (i) one or more specific CNNs, among the (K_1)-st CNN to the (K_N)-th CNN, whose similarity scores are larger than a fourth threshold and (ii) the K-th CNN.

In accordance with still yet another object of the present disclosure, there is provided a testing device for performing a seamless parameter switch by using a location-specific algorithm selection, to thereby allow a subject vehicle to perform an optimized autonomous driving in each of regions, including: at least one memory that stores instructions; and at least one processor configured to execute the instructions to perform processes of: (I) on condition that (1) a learning device, if one or more K-th training images corresponding to at least one K-th region are acquired, has instructed at least one K-th convolutional layer of a K-th Convolutional Neural Network (CNN) included therein to apply at least one K-th convolution operation to the K-th training images, to thereby generate one or more K-th feature maps for training, (2) the learning device has instructed at least one K-th output layer of the K-th CNN to apply at least one K-th output operation to the K-th feature maps for training, to thereby generate one or more pieces of K-th estimated autonomous driving source information for training, (3) the learning device has instructed at least one K-th loss layer of the K-th CNN to generate at least one K-th loss by using the K-th estimated autonomous driving source information for training and its corresponding K-th Ground-Truth (GT) autonomous driving source information, and then to perform backpropagation by using the K-th loss, to thereby learn at least part of K-th parameters of the K-th CNN, and (4) the learning device has stored the K-th CNN in a database after tagging K-th location information of the K-th region to the K-th CNN, wherein the K-th CNN is one of a first CNN to an M-th CNN, and wherein M is an integer larger than 1, and K is an integer from 1 to M, instructing the K-th CNN corresponding to the K-th region including the subject vehicle at a K-th timing to generate K-th estimated autonomous driving source information for testing by using a K-th test image, and (II) instructing an autonomous driving module to perform an autonomous driving of the subject vehicle by referring to the K-th estimated autonomous driving source information for testing.

As one example, at the process of (I), the processor acquires a K-th representative CNN for a K-th extensive region including the K-th region, and then instructs the K-th representative CNN to generate the K-th estimated autonomous driving source information for testing.

As one example, before performing a process of generating the K-th estimated autonomous driving source information for testing at the process of (I), the processor further performs processes of: (I-1) if the subject vehicle is located in a (K-1)-th region which is adjacent to the K-th region at a (K-1)-th timing which is earlier than the K-th timing, monitoring whether the subject vehicle has moved from a (K-1)_1-st partial region in the (K-1)-th region to a (K-1)_2-nd partial region therein or not, by referring to subject location information acquired from a Global Positioning System (GPS) in the subject vehicle, and (I-2) if a movement of the subject vehicle from the (K-1)_1-th partial region to the (K-1)_2-nd partial region has been detected, acquiring the K-th CNN corresponding to the K-th region where the subject vehicle is to be located at the K-th timing by referring to an estimated route of the subject vehicle.

As one example, at the process of (I-2), (i) the processor acquires information on the estimated route from the autonomous driving module, if the subject vehicle has been performing the autonomous driving at a timing when the subject vehicle has moved to the (K-1)_2-nd partial region, and (ii) the testing device acquires the information on the estimated route from an Advanced Driving Assistance System (ADAS) in the subject vehicle if the subject vehicle has been performing a semi-autonomous driving at the timing when the subject vehicle has moved to the (K-1)_2-nd partial region and its destination has been inputted to the ADAS.

As one example, at the process of (I-2), the processor, if the subject vehicle has been performing a manual driving at a timing when the subject vehicle has moved to the (K-1)_2-nd partial region or if the subject vehicle has been performing a semi-autonomous driving but its destination has not been inputted to an ADAS in the subject vehicle, performs an inverse reinforcement learning algorithm by using information on a past route which had been driven by the subject vehicle in a time range from a (K-P)-th timing to the (K-1)-th timing, to thereby acquire the estimated route, wherein P is an integer from 1 to T-1.

As one example, at the process of (I), the processor, if each of the first to the M-th CNNs is stored in the database with its information, tagged thereto, on each of locations where its corresponding training images have been acquired and each of timings when said its corresponding training images have been acquired, instructs the K-th CNN which corresponds to both of the K-th region and a K-th time range including the K-th timing to generate the K-th estimated autonomous driving source information for testing.

In addition, recordable media that are readable by a computer for storing a computer program to execute the method of the present disclosure is further provided.

BRIEF DESCRIPTION OF THE DRAWINGS

The above and other objects and features of the present disclosure will become apparent from the following description of preferred embodiments given in conjunction with the accompanying drawings.

The following drawings to be used to explain example embodiments of the present disclosure are only part of example embodiments of the present disclosure and other drawings can be obtained based on the drawings by those skilled in the art of the present disclosure without inventive work.

DETAILED DESCRIPTION OF THE PREFERRED EMBODIMENTS

Detailed explanation on the present disclosure to be made below refer to attached drawings and diagrams illustrated as specific embodiment examples under which the present disclosure may be implemented to make clear of purposes, technical solutions, and advantages of the present disclosure. These embodiments are described in sufficient detail to enable those skilled in the art to practice the disclosure.

Besides, in the detailed description and claims of the present disclosure, a term "include" and its variations are not intended to exclude other technical features, additions, components or steps. Other objects, benefits and features of the present disclosure will be revealed to one skilled in the art, partially from the specification and partially from the implementation of the present disclosure. The following examples and drawings will be provided as examples but they are not intended to limit the present disclosure.

Moreover, the present disclosure covers all possible combinations of example embodiments indicated in this specification. It is to be understood that the various embodiments of the present disclosure, although different, are not necessarily mutually exclusive. For example, a particular feature, structure, or characteristic described herein in connection with one embodiment may be implemented within other embodiments without departing from the spirit and scope of the present disclosure. In addition, it is to be understood that the position or arrangement of individual elements within each disclosed embodiment may be modified without departing from the spirit and scope of the present disclosure. The following detailed description is, therefore, not to be taken in a limiting sense, and the scope of the present disclosure is defined only by the appended claims, appropriately interpreted, along with the full range of equivalents to which the claims are entitled. In the drawings, like numerals refer to the same or similar functionality throughout the several views.

Any images referred to in the present disclosure may include images related to any roads paved or unpaved, in which case the objects on the roads or near the roads may include vehicles, persons, animals, plants, buildings, flying objects like planes or drones, or any other obstacles which may appear in a road-related scene, but the scope of the present disclosure is not limited thereto. As another example, said any images referred to in the present disclosure may include images not related to any roads, such as images related to alleyway, land lots, sea, lakes, rivers, mountains, forests, deserts, sky, or any indoor space, in which case the objects in said any images may include vehicles, persons, animals, plants, buildings, flying objects like planes or drones, ships, amphibious planes or ships, or any other obstacles which may appear in a scene related to alleyway, land lots, sea, lakes, rivers, mountains, forests, deserts, sky, or any indoor space, but the scope of the present disclosure is not limited thereto.

To allow those skilled in the art to carry out the present disclosure easily, the example embodiments of the present disclosure by referring to attached diagrams will be explained in detail as shown below.

Figure 1:
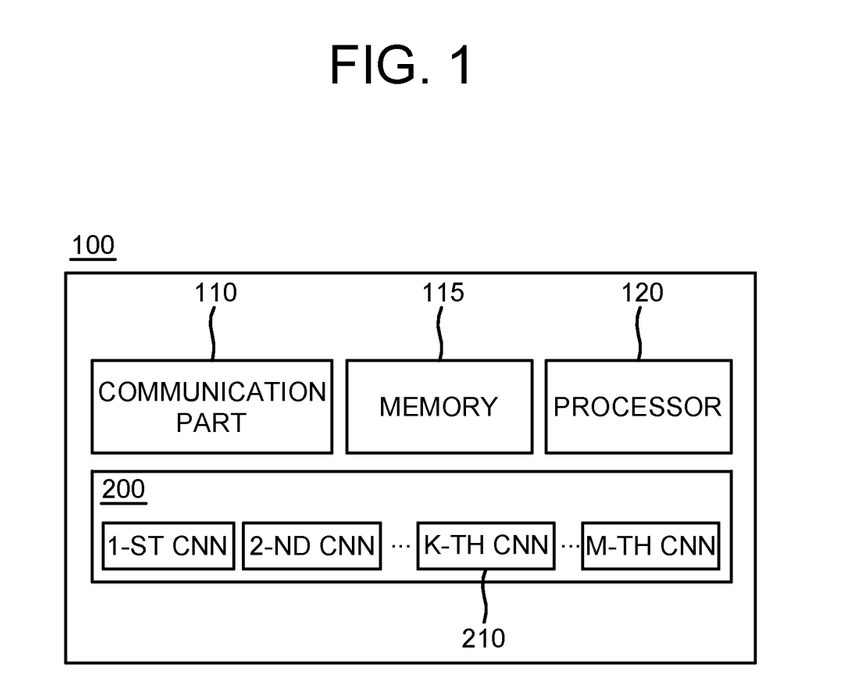
FIG. 1 is a drawing schematically illustrating a configuration of a computing device performing a method for a seamless parameter switch by using a location-specific algorithm selection to achieve an optimized autonomous driving in each of regions in accordance with an example embodiment of the present disclosure.

FIG. 1 is a drawing schematically illustrating a configuration of a computing device performing a method for a seamless parameter switch by using a location-specific algorithm selection to achieve an optimized autonomous driving in each of regions in accordance with an example embodiment of the present disclosure.

By referring to FIG. 1, the learning device 100 may include a database 200, including a first to an M-th CNN, to be described later. Processes of input/output and computations of the database 200 may be respectively performed by at least one communication part 110 and at least one processor 120. However, detailed communication schematics between the communication part 110 and the processor 120 are omitted in FIG. 1. Herein, a memory 115 may have stored various instructions to be described later, and the processor 115 may execute the instructions stored in the memory 115 and may perform processes of the present disclosure by executing the instructions to be disclosed later. Such description of the learning device 100 does not exclude an integrated device including any combination of a processor, a memory, a medium, or any other computing components.

So far the configuration of the learning device 100 for performing the method for the seamless parameter switch by using the location-specific algorithm selection to achieve the optimized autonomous driving in each of the regions in accordance with one example embodiment of the present disclosure has been explained. Below, in order to explain the learning method for the seamless parameter switch, a configuration of a K-th CNN 210 will be explained by referring to FIG. 2.

Figure 2:
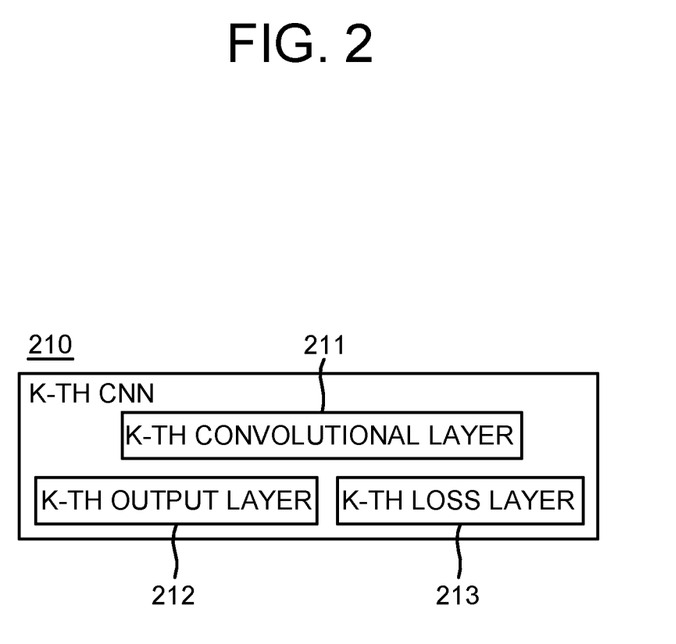
FIG. 2 is a drawing schematically illustrating a configuration of a K-th CNN to be used for performing the method for the seamless parameter switch by using the location-specific algorithm selection to achieve the optimized autonomous driving in each of the regions in accordance with one example embodiment of the present disclosure.

FIG. 2 is a drawing schematically illustrating the configuration of the K-th CNN to be used for performing the method for the seamless parameter switch by using the location-specific algorithm selection to achieve the optimized autonomous driving in each of the regions in accordance with one example embodiment of the present disclosure.

By referring to FIG. 2, the K-th CNN 210 may include at least one K-th convolutional layer 211, at least one K-th output layer 212 and at least one K-th loss layer 213. If one or more K-th training images, to be explained later, are inputted to the K-th CNN 210, those may be processed by the K-th convolutional layer 211 and the K-th output layer 212. Herein, the K-th convolutional layer 211 may perform a K-th convolution operation. More specifically, the learning device 100 may instruct each of one or more K-th convolutional neurons in the K-th convolutional layer to repeat processes of applying at least one convolution operation to its inputted value and then delivering its outputted value to its next K-th convolutional neuron, to thereby apply the K-th convolution operation to the K-th training images. As a result of the K-th convolution operation, one or more K-th feature maps may be generated.

The K-th feature maps may be inputted to the K-th output layer 212, and the K-th output layer may process those differently according to separate embodiments. Specifically, if a programmer has wanted K-th estimated autonomous driving source information, which is an output of the K-th CNN 210 to be explained later, to include information on segmentations of the K-th training images, the K-th output layer 212 may have been built as a K-th deconvolutional layer corresponding to the K-th convolutional layer. In this case, the K-th output layer 212 may apply a K-th output operation to the K-th feature maps to thereby generate the K-th estimated autonomous driving source information including information on K-th estimated segmentation images corresponding to the K-th training images.

Otherwise, if the programmer has wanted the K-th estimated autonomous driving source information to include information on objects in the K-th training images, the K-th output layer 212 may have been built as a K-th Fully-Connected (FC) layer. In this case, the K-th output layer 212 may apply the K-th output operation to the K-th feature maps to thereby generate the K-th estimated autonomous driving source information including information on K-th estimated object detection results on the K-th training images.

After the K-th estimated autonomous driving source information is acquired, the K-th loss layer 213 may generate at least one K-th loss by using the K-th estimated autonomous driving source information and its corresponding K-th Ground-Truth (GT) autonomous driving source information, and then perform backpropagation by using the K-th loss, to thereby learn at least part of K-th parameters of the K-th CNN 210. Such K-th CNN 210 may have been optimized to generate information to be used for performing an autonomous driving in a K-th region corresponding thereto, through said processes performed by the K-th convolutional layer 211, the K-th output layer 212 and the K-th loss layer 213.

Below, the learning method for the K-th CNN 210 will be explained specifically, by referring to FIG. 3.

Figure 3:
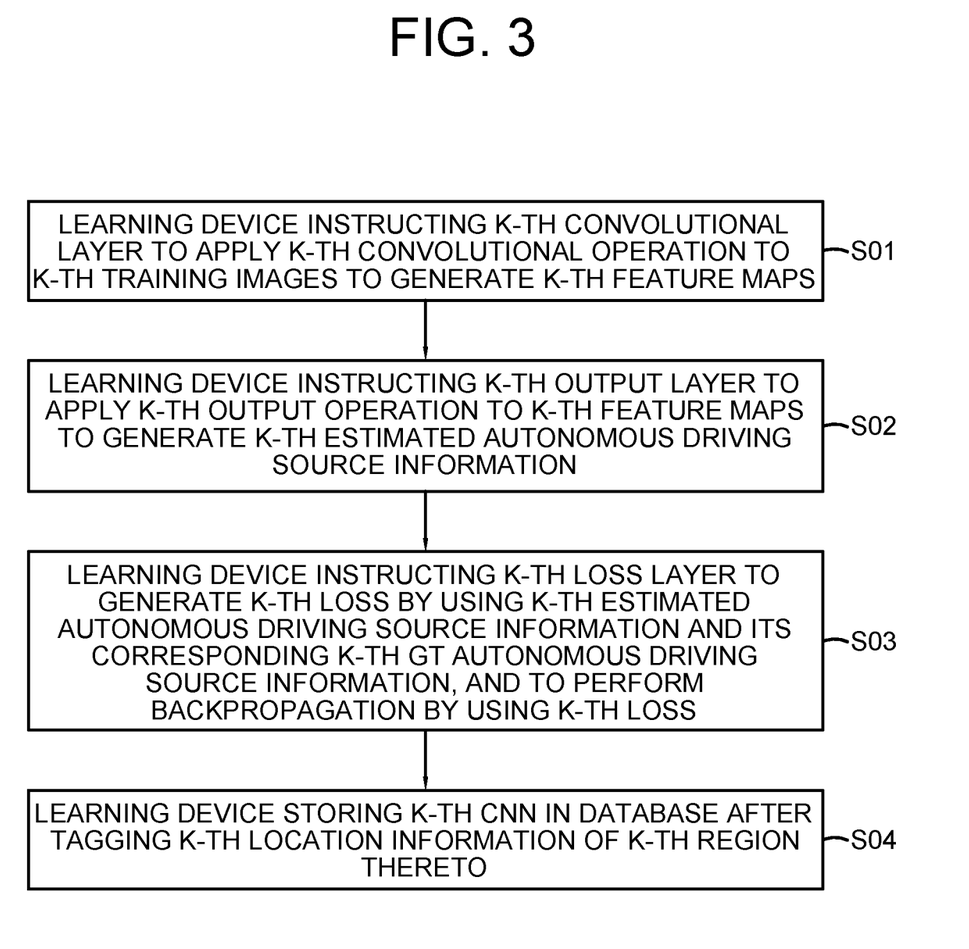
FIG. 3 is a drawing schematically illustrating a flow of the method for the seamless parameter switch by using the location-specific algorithm selection to achieve the optimized autonomous driving in each of the regions in accordance with one example embodiment of the present disclosure.

FIG. 3 is a drawing schematically illustrating a flow of the method for the seamless parameter switch by using the location-specific algorithm selection to achieve the optimized autonomous driving in each of the regions in accordance with one example embodiment of the present disclosure.

By referring to FIG. 3, at a step of S01, if the K-th training images corresponding to the K-th region are acquired, the learning device may instruct the K-th convolutional layer 211 in the K-th CNN 210 to apply the K-th convolution operation to the K-th training images to thereby generate the K-th feature maps. Then, at a step of S02, the learning device 100 may instruct the K-th output layer 212 in the K-th CNN 210 to apply the K-th output operation to the K-th feature maps, to thereby generate the K-th estimated autonomous driving source information. And, at a step of S03, the learning device 100 may instruct the K-th loss layer 213 of the K-th CNN 210 to generate the K-th loss by using the K-th estimated autonomous driving source information and its corresponding K-th GT autonomous driving source information, and then to perform backpropagation by using the K-th loss, to thereby learn at least part of the K-th parameters of the K-th CNN. Finally, at a step of S04, the learning device 100 may store the K-th CNN 210 in the database 200 after tagging K-th location information of the K-th region to the K-th CNN 210.

Said steps are basic steps of the learning method. Hereinafter, additional steps thereof will be introduced. That is, the learning device 100 may acquire some adjacent CNNs corresponding to regions adjacent to the K-th region, part of which are to be integrated with the K-th CNN 210. Specifically, the learning device 100 may acquire information on each of a (K_1)-st CNN to a (K_N)-th CNN, selected among said first to said M-th CNN, corresponding to each of a (K_1)-st region to a (K_N)-th region whose distance from the K-th region is smaller than a first threshold, wherein N is an integer larger than 0. Herein, the distance between two regions may be calculated by comparing center points of each of said two regions, or by comparing specific points where vehicles are mainly located in each of said two regions from a view of statistics, however, a scope of the present disclosure may not be limited thereto. After the information on the (K_1)-st CNN to the (K_N)-th CNN is acquired, the learning device 100 may calculate similarity scores including a (K_1)-st similarity score between the K-th parameters and (K_1)-st parameters of the (K_1)-st CNN to a (K_N)-th similarity score between the K-th parameters and (K_N)-th parameters of the (K_N)-th CNN. Thereafter, the learning device 100 may generate a K-th representative CNN corresponding to a K-th extensive region including the K-th region and at least part of its adjacent regions, by referring to at least part of (i) one or more specific CNNs among the (K_1)-st CNN to the (K_N)-th CNN whose similarity scores are larger than a second threshold, and (ii) the K-th CNN 210.

As an example, the (K_1)-th similarity score to the (K_N)-th similarity score may be calculated by using a following formula:

$$S_{K\_Q} = \sum_l |P_{K_l} - P_{(K\_Q)_l}|^2$$

Herein, $S_{K\_Q}$ may denote a (K_Q)-th similarity score among the (K_1)-st similarity score to the (K_N)-th similarity score, $P_{K_l}$ may denote an l-th component of the K-th parameters, and $P_{(K\_Q)_l}$ may denote an l-th component of (K_Q)-th parameters of a (K_Q)-th CNN corresponding to the (K_Q)-th similarity score, wherein Q is an integer from 1 to N. That is, differences between each of component parameters, corresponding to each of relative same positions, among all parameters in each of the (K_Q)-th CNN and the K-th CNN, may be calculated and then those are squared and summed up to generate the (K_Q)-th similarity score.

After the specific CNNs are determined by using the similarity scores calculated as shown above, the learning device 100 may calculate each of averages for each of component parameters, corresponding to each of relative same positions, among all parameters in each of the specific CNNs and the K-th CNN 210.

Below, why such processes are necessary will be explained simply. The (K_1)-st CNN to the (K_N)-th CNN, which the learning device 100 acquires, may have been trained by using images acquired near the K-th region where the K-th training images have been acquired to train the K-th CNN 210. The reason why the learning device 100 acquires information on such CNNs is to generate an optimized CNN, i.e., the K-th representative CNN, for a subject vehicle to be located in the K-th extensive region including the K-th region and at least part of its adjacent regions. Thereafter, the learning device 100 may select the specific CNNs, among the (K_1)-st CNN to the (K_N)-th CNN, whose parameters are similar to those of the K-th CNN. Herein, the parameters of the specific CNNs may be similar to those of the K-th CNN when a sum of differences between the parameters of the specific CNNs and those of the K-th CNN is smaller than a threshold or when a sum of squares of the differences is smaller than another threshold. The specific CNNs should be further selected among the adjacent CNNs, because not all the adjacent CNNs are appropriate to be integrated with the K-th CNN 210, but CNNs similar to the K-th CNN 210, i.e., the specific CNNS among the adjacent CNNs, are appropriate to be integrated with the K-th CNN 210. That is, some of said images acquired near the K-th region may include different scenes according to its direction or circumstances of a timing when said some of the images had been photographed, which may cause differences between their corresponding adjacent CNNs and the K-th CNN 210. In this case, if some of the adjacent CNNs, which are much different from the K-th CNN 210 due to a usage of the different images, are integrated to the K-th CNN 210, the integrated CNN, i.e., the K-th representative CNN, will not function properly, thus the specific CNNs should be selected. By referring to FIG. 4, an example of such different scenes may be seen.

Figure 4:
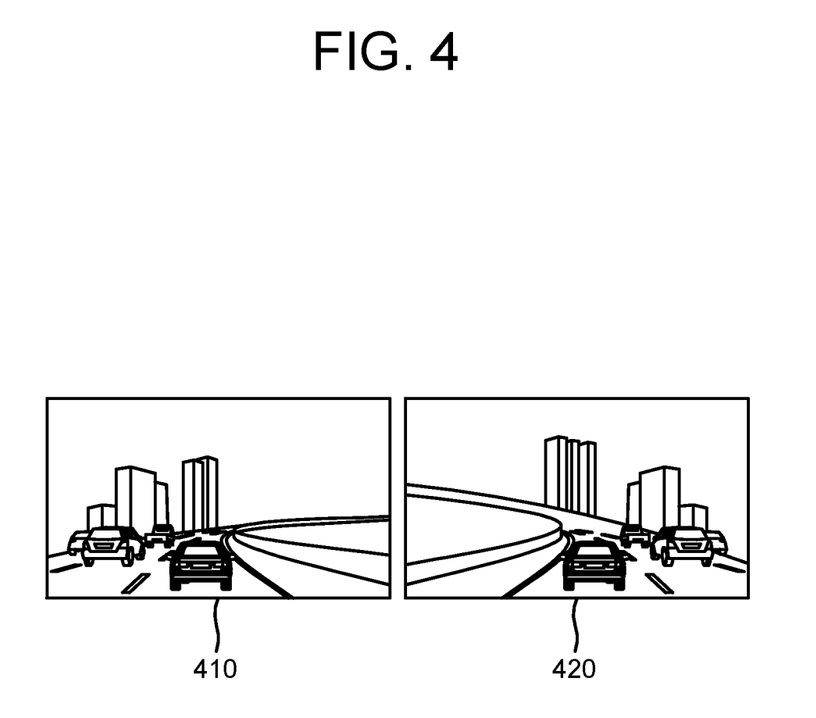
FIG. 4 is a drawing schematically illustrating one of K-th training images and one of another training images acquired at a place similar to that of the K-th training images but different from the K-th training images, to be used for performing the method for the seamless parameter switch by using the location-specific algorithm selection to achieve the optimized autonomous driving in each of the regions in accordance with one example embodiment of the present disclosure.

FIG. 4 is a drawing schematically illustrating one of K-th training images and one of another training images acquired at a place similar to that of the K-th training images but different from the K-th training images, to be used for performing the method for the seamless parameter switch by using the location-specific algorithm selection to achieve the optimized autonomous driving in each of the regions in accordance with one example embodiment of the present disclosure.

By referring to FIG. 4, a specific K-th training image 410 among the K-th training images and an example image 420 which has been used for training a CNN which is not one of the specific CNNS among the (K_1)-st CNN to the (K_N)-th CNN may be seen. The specific K-th training image 410 may have been photographed from a vehicle driving a riverside road with a river on its right, and the example image 420 may have been photographed from a vehicle driving the same riverside road in an opposite direction, with the river on its left. Herein, the K-th CNN 210, which has been trained by using the K-th training images similar to the specific K-th training image 410, may include relatively smaller parameters for a right side of its inputted image and relatively larger parameters for a middle and a left side of its inputted image. Comparing to this, said CNN trained by using images similar to the example image 420 may have been trained to include relatively smaller parameters for a left side of its inputted image and relatively larger parameters for a middle and a right side of its inputted image. Both of the CNNs, i.e., the CNN trained by referring to the specific K-th training image 410 and the CNN trained by referring to the example image 420, correspond to the K-th region, but characteristics of the two are different, thus those should be separated. Said processes of generating the similarity scores are designed to separate CNNs whose relationships are similar to those two.

Herein, each of regions in the K-th extensive region, covered by the K-th representative CNN which has been generated by using the specific CNNs and the K-th CNN 210 selected as shown above, may have one or more common characteristics among them, including at least part of topographical characteristics, climatic characteristics and building arrangement characteristics. For example, each of regions of the K-th extensive region may correspond to the riverside road with the river on its left, and the K-th representative CNN may be able to extract information on a middle part and a right part of its inputted image. For another example, each of the regions thereof may correspond to a valley where fog occurs often, and the K-th representative CNN may have been optimized to detect objects which looks vague in its inputted image.

The process shown so far is a basic embodiment related to a method for generating a location-specifically optimized CNN. Below, as another example embodiment, a method for generating a CNN optimized both location-specifically and time-specifically, will be introduced.

By referring to FIG. 3 again, at the step of S04 in accordance with the basic embodiment, the K-th location information is tagged to the K-th CNN 210 to be stored in the database 200. In this embodiment, K-th time information, corresponding to a K-th timing when the K-th training images have been acquired, along with the K-th location information may be tagged to the K-th CNN 210. Thereafter, the learning device 100 may acquire information on each of a (K_1)-st CNN to a (K_N)-th CNN, selected among the first CNN to the M-th CNN, corresponding to each of a (K_1)-st timing to a (K_N)-th timing whose differences from the K-th timing are smaller than a third threshold. Then, the learning device 100 may calculate similarity scores including a (K_1)-st similarity score between the K-th parameters and (K_1)-st parameters of the (K_1)-st CNN to a (K_N)-th similarity score between the K-th parameters and (K_N)-th parameters of the (K_N)-th CNN, and may generate a K-th representative CNN corresponding to a K-th time range including the K-th timing by referring to at least part of (i) one or more another specific CNNs, among the (K_1)-st CNN to the (K_N)-th CNN, whose similarity scores are larger than a fourth threshold and (ii) the K-th CNN 210. Herein, the K-th time range may be from a timing x seconds earlier than the K-th timing to a timing y seconds later than the K-th timing.

Such embodiment can be effective because images on same region can be different according to whether timings when the images has been photographed are day or night. Herein, some of the notations, e.g., the (K_1)-st CNN to the (K_N)-th CNN and the similarity scores, are same as those of the basic embodiment, but meanings of the notations may different between each other.

Below, a testing method of the present disclosure will be explained.

First, a testing device may be a computing device interworking with the subject vehicle. On this basis, one condition that (1) the learning device 100, if the K-th training images corresponding to the K-th region are acquired, has instructed the K-th convolutional layer 211 of the K-th CNN 210 included therein to apply the K-th convolution operation to the K-th training images, to thereby generate K-th feature maps for training, (2) the learning device 100 has instructed the K-th output layer 212 of the K-th CNN 210 to apply the K-th output operation to the K-th feature maps for training, to thereby generate one or more pieces of K-th estimated autonomous driving source information for training, (3) the learning device 100 has instructed the K-th loss layer 213 of the K-th CNN 210 to generate the K-th loss by using the K-th estimated autonomous driving source information for training and its corresponding K-th GT autonomous driving source information, and then to perform backpropagation by using the K-th loss, to thereby learn at least part of the K-th parameters of the K-th CNN, and (4) the learning device 100 has stored the K-th CNN 210 in the database 200 after tagging the K-th location information of the K-th region to the K-th CNN, and wherein the K-th CNN is one of the first CNN to the M-th CNN, wherein M is an integer larger than 1, and K is an integer from 1 to M; the testing device may instruct the K-th CNN 210 corresponding to the K-th region including the subject vehicle at a K-th timing for testing to generate K-th estimated autonomous driving source information for testing by using a K-th test image.

Then, the testing device may instruct an autonomous driving module to perform the autonomous driving of the subject vehicle by referring to the K-th estimated autonomous driving source information for testing.

In an example embodiment where the K-th representative CNN has been generated, the testing device may instruct the K-th representative CNN, not the K-th CNN 210, to generate the K-th estimated autonomous driving source information for testing.

Such K-th CNN 210 or such K-th representative CNN may have been acquired from the database 200 before the subject vehicle enters the K-th region or the K-th extensive region. Below, how the K-th CNN 210 or the K-th representative CNN can be acquired will be explained. For convenience, the below explanation will correspond to the K-th CNN 210.

First, if the subject vehicle is located in a (K−1)-th region which is adjacent to the K-th region at a (K−1)-th timing which is earlier than the K-th timing, the testing device may perform monitoring whether the subject vehicle has moved from a (K−1)_1-st partial region in the (K−1)-th region to a (K−1)_2-nd partial region therein or not, by referring to subject location information acquired from a Global Positioning System (GPS) in the subject vehicle.

Figure 5:
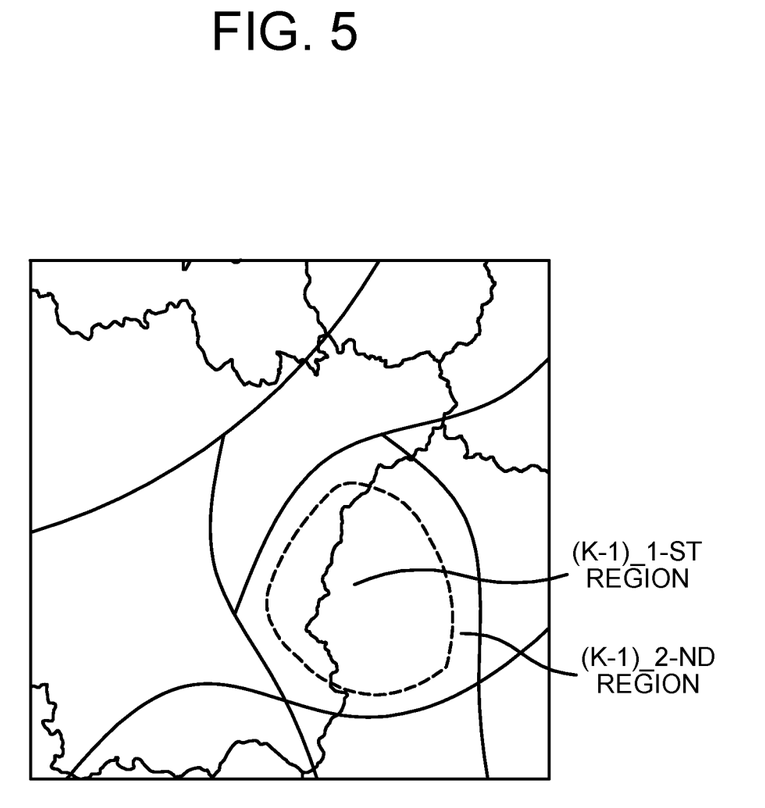
FIG. 5 is a drawing schematically illustrating a (K-1)_1-st partial region and a (K-1)_2-nd partial region to be used for performing the method for the seamless parameter switch by using the location-specific algorithm selection to achieve the optimized autonomous driving in each of the regions in accordance with one example embodiment of the present disclosure.

In order to explain why such process is necessary, FIG. 5 will be referred to.

FIG. 5 is a drawing schematically illustrating the (K−1) 1-st partial region and the (K−1)_2-nd partial region to be used for performing the method for the seamless parameter switch by using the location-specific algorithm selection to achieve the optimized autonomous driving in each of the regions in accordance with one example embodiment of the present disclosure.

By referring to FIG. 5, it can be seen that the (K−1)_1-st partial region may be located in a center of the (K−1)-th region, and the (K−1)_2-nd partial region may be located in relatively closer to its borders. If the subject vehicle has moved from the (K−1)_1-th partial region to the (K−1)_2-nd partial region, then the subject vehicle is likely to move to other regions corresponding to other CNNs. Thus such movement should be monitored.

If a movement of the subject vehicle from the (K−1)_1-th partial region to the (K−1)_2-nd partial region has been detected, the testing device may acquire the K-th CNN 210 corresponding to the K-th region where the subject vehicle is to be located at the K-th timing by referring to an estimated route of the subject vehicle. Below, how the estimated route can be acquired will be explained.

First, if the subject vehicle has been performing the autonomous driving at a timing when the subject vehicle has moved to the (K−1)_2-nd partial region, the testing device may acquire information on the estimated route from the autonomous driving module. Or, if the subject vehicle has been performing a semi-autonomous driving at the timing when the subject vehicle has moved to the (K−1)_2-nd partial region and its destination has been inputted to an Advanced Driving Assistance System (ADAS) in the subject vehicle, the testing device may acquire the information on the estimated route from the ADAS.

Otherwise, if the subject vehicle has been performing a manual driving at a timing when the subject vehicle has moved to the (K−1)_2-nd partial region or if the subject vehicle has been performing the semi-autonomous driving but its destination has not been inputted to the ADAS in the subject vehicle, the testing device may perform an inverse reinforcement learning algorithm by using information on a past route which had been driven by the subject vehicle in a time range from a (K−P)-th timing to the (K−1)-th timing, to thereby acquire the estimated route. Herein, P may be an integer from 1 to T−1. Such process of applying the inverse reinforcement learning algorithm to the past route in order to generate the estimated route has been introduced by a thesis named "Maximum Entropy Inverse Reinforcement Learning" by Ziebart et al. Thus, a person in the art may be easily understand the above explanations.

Meanwhile, if said another example embodiment for a time-specifically optimized CNN has been applied to the testing method, the K-th CNN can be acquired according to information on time. That is, if each of the first to the M-th CNNs is stored in the database with its information, tagged thereto, on each of locations where its corresponding training images have been acquired and each of timings when said its corresponding training images have been acquired, the testing device may acquire the K-th CNN by transmitting a query by referring to K-th location information for testing and K-th time information for testing, and then instruct the K-th CNN which corresponds to both of the K-th region and the K-th time range including the K-th timing to generate the K-th estimated autonomous driving source information for testing. In this case, as an example, the K-th CNN, which is optimized for a circumstance of a morning in the riverside road with the river on a left of the vehicle, can be used for performing the autonomous driving.

By using such method, each of CNNs optimized for each of circumstances can be used, thus a more efficient autonomous driving can be performed.

The present disclosure has an effect of providing a method for the seamless parameter switch by using the location-specific algorithm selection to achieve the optimized autonomous driving in each of the regions.

The present disclosure has another effect of providing the method for the seamless parameter switch by using the location-specific algorithm selection to achieve the optimized autonomous driving in each of the regions, to thereby allow the Convolutional Neural Networks (CNNs) to consume less computing resources.

The present disclosure has still another effect of providing the method for the seamless parameter switch by using the location-specific algorithm selection to achieve the optimized autonomous driving in each of the regions, to thereby allow the CNNs to perform more properly.

The present disclosure has still yet another effect of providing the method for the seamless parameter switch by using the time-specific algorithm selection to achieve the optimized autonomous driving in each of the regions, to thereby use each of optimized CNNs for each of time ranges.

The embodiments of the present disclosure as explained above can be implemented in a form of executable program command through a variety of computer means recordable to computer readable media. The computer readable media may include solely or in combination, program commands, data files, and data structures. The program commands recorded to the media may be components specially designed for the present disclosure or may be usable to a skilled human in a field of computer software. Computer readable media include magnetic media such as hard disk, floppy disk, and magnetic tape, optical media such as CD-ROM and DVD, magneto-optical media such as floptical disk and hardware devices such as ROM, RAM, and flash memory specially designed to store and carry out program commands. Program commands include not only a machine language code made by a complier but also a high level code that can be used by an interpreter etc., which is executed by a computer. The aforementioned hardware device can work as more than a software module to perform the action of the present disclosure and they can do the same in the opposite case.

As seen above, the present disclosure has been explained by specific matters such as detailed components, limited embodiments, and drawings. They have been provided only to help more general understanding of the present disclosure. It, however, will be understood by those skilled in the art that various changes and modification may be made from the description without departing from the spirit and scope of the disclosure as defined in the following claims.

Accordingly, the thought of the present disclosure must not be confined to the explained embodiments, and the following patent claims as well as everything including variations equal or equivalent to the patent claims pertain to the category of the thought of the present disclosure.

What is claimed is:

1. A learning method for performing a seamless parameter switch by using a location-specific algorithm selection, to thereby allow a subject vehicle to perform an optimized autonomous driving in each of regions, comprising steps of:

(a) instructing, by a learning device, when one or more K-th training images corresponding to at least one K-th region are acquired, at least one K-th convolutional layer of a K-th Convolutional Neural Network (CNN) included therein to apply at least one K-th convolution operation to the K-th training images, to thereby generate one or more K-th feature maps;

(b) instructing, by the learning device, at least one K-th output layer of the K-th CNN to apply at least one K-th output operation to the K-th feature maps, to thereby generate one or more pieces of K-th estimated autonomous driving source information;

(c) instructing, by the learning device, at least one K-th loss layer of the K-th CNN to generate at least one K-th loss by using the K-th estimated autonomous driving source information and its corresponding K-th Ground-Truth (GT) autonomous driving source information, and then to perform backpropagation by using the K-th loss, to thereby learn at least part of K-th parameters of the K-th CNN;

(d) storing, by the learning device, the K-th CNN in a database after tagging K-th location information of the K-th region to the K-th CNN, wherein the K-th CNN is one of a first CNN to an M-th CNN, and wherein M is an integer larger than 1, and K is an integer from 1 to M;

(e) by the learning device, (i) acquiring information on each of a (K_1)-st CNN to a (K_N)-th CNN, selected among the first CNN to the M-th CNN, corresponding to each of a (K_1)-st region to a (K_N)-th region whose distance from the K-th region is smaller than a first threshold, and then (ii) calculating similarity scores including a (K_1)-st similarity score between the K-th parameters and (K_1)-st parameters of the (K_1)-st CNN to a (K_N)-th similarity score between the K-th parameters and (K_N)-th parameters of the (K_N)-th CNN; and (f) generating, by the learning device, generating a K-th representative CNN corresponding to a K-th extensive region including the K-th region by referring to at least part of (i) one or more specific CNNs, among the (K_1)-st CNN to the (K_N)-th CNN, whose similarity scores are larger than a second threshold and (ii) the K-th CNN, and wherein N is an integer larger than 0.

2. The method of claim 1, wherein, at the step of (e), calculating, by the learning device, the (K_1)-st similarity score to the (K_N)-th similarity score by referring to a following formula:

$$S_{K\_Q} = \sum_l |P_{K_l} - P_{(K\_Q)_l}|^2$$

wherein $S_{K\_Q}$ denotes a (K_Q)-th similarity score among the (K_1)-st similarity score to the (K_N)-th similarity score, $P_{K_l}$ denotes an l-th component parameter of the K-th parameters, and $P_{(K\_Q)_l}$ denotes an l-th component parameter of (K_Q)-th parameters of a (K_Q)-th CNN corresponding to the (K_Q)-th similarity score, wherein Q is an integer from 1 to N.

3. The method of claim 1, wherein, at the step of (f), calculating, by the learning device, each of averages for each of component parameters, corresponding to each of relative same positions, among all parameters in each of the specific CNNs and the K-th CNN, to thereby generate the K-th representative CNN which include said averages as its parameters.

4. The method of claim 1, wherein, each of regions in the K-th extensive region has one or more common characteristics thereamong, wherein the common characteristics include at least part of topographical characteristics, climatic characteristics and building arrangement characteristics.

5. The method of claim 1, wherein, at the step of (a), instructing, by the learning device, each of one or more K-th convolutional neurons in the K-th convolutional layer to repeat processes of applying at least one convolution operation to its inputted value and then delivering its outputted value to its next K-th convolutional neuron, to thereby apply the K-th convolution operation to the K-th training images.

6. The method of claim 1, wherein, at the step of (b), instructing, by the learning device, the K-th output layer which has been built as a K-th deconvolutional layer corresponding to the K-th convolutional layer, to apply the K-th output operation which corresponds to a K-th deconvolution operation, to the K-th feature maps, to thereby generate the K-th estimated autonomous driving source information including information on K-th estimated segmentation images corresponding to the K-th training images.

7. The method of claim 1, wherein, at the step of (b), instructing, by the learning device, the K-th output layer which has been built as a K-th Fully-Connected (FC) layer, to apply the K-th output operation which corresponds to a K-th FC network operation, to the K-th feature maps, to thereby generate the K-th estimated autonomous driving source information including information on K-th estimated object detection results corresponding to the K-th training images.

8. The method of claim 1, wherein, at the step of (d), by the learning device (i) storing the K-th CNN in the database after tagging the K-th location information along with K-th time information, the K-th time information corresponding to a K-th timing when the K-th training images have been acquired, to the K-th CNN, (ii) acquiring information on each of a (K_1)-st CNN to a (K_N)-th CNN, selected among the first CNN to the M-th CNN, corresponding to each of a (K_1)-st timing to a (K_N)-th timing whose differences from the K-th timing are smaller than a third threshold, (iii) calculating similarity scores including a (K_1)-st similarity score between the K-th parameters and (K_1)-st parameters of the (K_1)-st CNN to a (K_N)-th similarity score between the K-th parameters and (K_N)-th parameters of the (K_N)-th CNN, and (iv) generating a K-th representative CNN corresponding to a K-th time range including the K-th timing by referring to at least part of (i) one or more specific CNNs, among the (K_1)-st CNN to the (K_N)-th CNN, whose similarity scores are larger than a fourth threshold and (ii) the K-th CNN.

9. A testing method for performing a seamless parameter switch by using a location-specific algorithm selection, to thereby allow a subject vehicle to perform an optimized autonomous driving in each of regions, comprising steps of:

(a) on condition that (1) when one or more K-th training images corresponding to at least one K-th region are acquired, instructing, by a learning device, at least one K-th convolutional layer of a K-th Convolutional Neural Network (CNN) included therein to apply at least one K-th convolution operation to the K-th training images, to thereby generate one or more K-th feature maps for training, (2) instructing, by the learning device, at least one K-th output layer of the K-th CNN to apply at least one K-th output operation to the K-th feature maps for training, to thereby generate one or more pieces of K-th estimated autonomous driving source information for training, (3) instructing, by the learning device, at least one K-th loss layer of the K-th CNN to generate at least one K-th loss by using the K-th estimated autonomous driving source information for training and its corresponding K-th Ground-Truth (GT) autonomous driving source information, and then to perform backpropagation by using the K-th loss, to thereby learn at least part of K-th parameters of the K-th CNN, and (4) storing, by the learning device, the K-th CNN in a database after tagging K-th location information of the K-th region to the K-th CNN, wherein the K-th CNN is one of a first CNN to an M-th CNN, and wherein M is an integer larger than 1, and K is an integer from 1 to M, (5) by the learning device (i) acquiring information on each of a (K_1)-st CNN to a (K_N)-th CNN, selected among the first CNN to the M-th CNN, corresponding to each of a (K_1)-st region to a (K_N)-th region whose distance from the K-th region is smaller than a first threshold, and then (ii) calculating similarity scores including a (K_1)-st similarity score between the K-th parameters and (K_1)-st parameters of the (K_1)-st CNN to a (K_N)-th similarity score between the K-th parameters and (K_N)-th parameters of the (K_N)-th CNN; and (6) generating, by the learning device, a K-th representative CNN corresponding to a K-th extensive region including the K-th region by referring to at least part of (i) one or more specific CNNs, among the (K_1)-st CNN to the (K_N)-th CNN, whose similarity scores are larger than a second threshold and (ii) the K-th CNN, and wherein N is an integer larger than 0, a testing device instructing the K-th CNN corresponding to the K-th region including the subject vehicle at a K-th timing to generate K-th estimated autonomous driving source information for testing by using a K-th test image; and (b) instructing, by the testing device, an autonomous driving module to perform an autonomous driving of the subject vehicle by referring to the K-th estimated autonomous driving source information for testing.

10. The method of claim 9, wherein, at the step of (a), acquiring, by the testing device, a K-th representative CNN for a K-th extensive region including the K-th region, and then instructing the K-th representative CNN to generate the K-th estimated autonomous driving source information for testing.

11. The method of claim 9, before performing a process of generating the K-th estimated autonomous driving source information for testing at the step of (a), further comprising steps of:

(a1) monitoring, by the testing device, when the subject vehicle is located in a (K−1)-th region which is adjacent to the K-th region at a (K−1)-th timing which is earlier than the K-th timing, whether the subject vehicle has moved from a (K−1)_1-st partial region in the (K−1)-th region to a (K−1)_2-nd partial region therein or not, by referring to subject location information acquired from a Global Positioning System (GPS) in the subject vehicle; and (a2) acquiring, by the testing device, when a movement of the subject vehicle from the (K−1)_1-th partial region to the (K−1) 2-nd partial region has been detected, the K-th CNN corresponding to the K-th region where the subject vehicle is to be located at the K-th timing by referring to an estimated route of the subject vehicle.

12. The method of claim 11, wherein, at the step of (a2), (i) acquiring, by the testing device, information on the estimated route from the autonomous driving module, when the subject vehicle has been performing the autonomous driving at a timing when the subject vehicle has moved to the (K−1)_2-nd partial region, and (ii) acquiring, by the testing device, the information on the estimated route from an Advanced Driving Assistance System (ADAS) in the subject vehicle when the subject vehicle has been performing a semi-autonomous driving at the timing when the subject vehicle has moved to the (K−1)_2-nd partial region and its destination has been inputted to the ADAS.

13. The method of claim 11, wherein, at the step of (a2), performing, by the testing device, when the subject vehicle has been performing a manual driving at a timing when the subject vehicle has moved to the (K−1)_2-nd partial region or when the subject vehicle has been performing a semi-autonomous driving but its destination has not been inputted to an ADAS in the subject vehicle, an inverse reinforcement learning algorithm by using information on a past route which had been driven by the subject vehicle in a time range from a (K−P)-th timing to the (K−1)-th timing, to thereby acquire the estimated route, wherein P is an integer from 1 to T−1.

14. The method of claim 9, wherein, at the step of (a), instructing, by the testing device, when each of the first to the M-th CNNs is stored in the database with its information, tagged thereto, on each of locations where its corresponding training images have been acquired and each of timings when said its corresponding training images have been acquired, the K-th CNN which corresponds to both of the K-th region and a K-th time range including the K-th timing to generate the K-th estimated autonomous driving source information for testing.

15. A learning device for performing a seamless parameter switch by using a location-specific algorithm selection, to thereby allow a subject vehicle to perform an optimized autonomous driving in each of regions, comprising:

at least one memory that stores instructions; and at least one processor configured to execute the instructions to perform processes of: (I) when one or more K-th training images corresponding to at least one K-th region are acquired, instructing at least one K-th convolutional layer of a K-th Convolutional Neural Network (CNN) included therein to apply at least one K-th convolution operation to the K-th training images, to thereby generate one or more K-th feature maps, (II) instructing at least one K-th output layer of the K-th CNN to apply at least one K-th output operation to the K-th feature maps, to thereby generate one or more pieces of K-th estimated autonomous driving source information, (III) instructing at least one K-th loss layer of the K-th CNN to generate at least one K-th loss by using the K-th estimated autonomous driving source information and its corresponding K-th Ground-Truth (GT) autonomous driving source information, and then to perform backpropagation by using the K-th loss, to thereby learn at least part of K-th parameters of the K-th CNN, and (IV) storing the K-th CNN in a database after tagging K-th location information of the K-th region to the K-th CNN, wherein the K-th CNN is one of a first CNN to an M-th CNN, and wherein M is an integer larger than 1, and K is an integer from 1 to wherein the processor further performs processes of: (V) (i) acquiring information on each of a (K_1)-st CNN to a (K_N)-th CNN, selected among the first CNN to the M-th CNN, corresponding to each of a (K_1)-st region to a (K_N)-th region whose distance from the K-th region is smaller than a first threshold, and then (ii) calculating similarity scores including a (K_1)-st similarity score between the K-th parameters and (K_1)-st parameters of the (K_1)-st CNN to a (K_N)-th similarity score between the K-th parameters and (K_N)-th parameters of the (K_N)-th CNN, and (VI) generating a K-th representative CNN corresponding to a K-th extensive region including the K-th region by referring to at least part of (i) one or more specific CNNs, among the (K_1)-st CNN to the (K_N)-th CNN, whose similarity scores are larger than a second threshold and (ii) the K-th CNN, and wherein N is an integer larger than 0.

16. The device of claim 15, wherein, at the process of (V), the processor calculates the (K_1)-st similarity score to the (K_N)-th similarity score by referring to a following formula:

$$S_{K\_Q} = \sum_l |P_{K_l} - P_{(K\_Q)_l}|^2$$

wherein $S_{K\_Q}$ denotes a (K_Q)-th similarity score among the (K_1)-st similarity score to the (K_N)-th similarity score, $P_{K_l}$ denotes an l-th component parameter of the K-th parameters, and $P_{(K\_Q)_l}$ denotes an l-th component parameter of (K_Q)-th parameters of a (K_Q)-th CNN corresponding to the (K_Q)-th similarity score, wherein Q is an integer from 1 to N.

17. The device of claim 15, wherein, at the process of (VI), the processor calculates each of averages for each of component parameters, corresponding to each of relative same positions, among all parameters in each of the specific CNNs and the K-th CNN, to thereby generate the K-th representative CNN which includes said averages as its parameters.

18. The device of claim 15, wherein, each of regions in the K-th extensive region has one or more common characteristics thereamong, wherein the common characteristics include at least part of topographical characteristics, climatic characteristics and building arrangement characteristics.

19. The device of claim 15, wherein, at the process of (I), the processor instructs each of one or more K-th convolutional neurons in the K-th convolutional layer to repeat processes of applying at least one convolution operation to its inputted value and then delivering its outputted value to its next K-th convolutional neuron, to thereby apply the K-th convolution operation to the K-th training images.

20. The device of claim 15, wherein, at the process of (II), the processor instructs the K-th output layer which has been built as a K-th deconvolutional layer corresponding to the K-th convolutional layer, to apply the K-th output operation which corresponds to a K-th deconvolution operation, to the K-th feature maps, to thereby generate the K-th estimated autonomous driving source information including information on K-th estimated segmentation images corresponding to the K-th training images.

21. The device of claim 15, wherein, at the process of (II), the processor instructs the K-th output layer which has been built as a K-th Fully-Connected (FC) layer, to apply the K-th output operation which corresponds to a K-th FC network operation, to the K-th feature maps, to thereby generate the K-th estimated autonomous driving source information including information on K-th estimated object detection results corresponding to the K-th training images.

22. The device of claim 15, wherein, at the process of (IV), the processor (i) stores the K-th CNN in the database after tagging the K-th location information along with K-th time information, the K-th time information corresponding to a K-th timing when the K-th training images have been acquired, to the K-th CNN, (ii) acquires information on each of a (K_1)-st CNN to a (K_N)-th CNN, selected among the first CNN to the M-th CNN, corresponding to each of a (K_1)-st timing to a (K_N)-th timing whose differences from the K-th timing are smaller than a third threshold, (iii) calculates similarity scores including a (K_1)-st similarity score between the K-th parameters and (K_1)-st parameters of the (K_1)-st CNN to a (K_N)-th similarity score between the K-th parameters and (K_N)-th parameters of the (K_N)-th CNN, and (iv) generates a K-th representative CNN corresponding to a K-th time range including the K-th timing by referring to at least part of (i) one or more specific CNNs, among the (K_1)-st CNN to the (K_N)-th CNN, whose similarity scores are larger than a fourth threshold and (ii) the K-th CNN.

23. A testing device for performing a seamless parameter switch by using a location-specific algorithm selection, to thereby allow a subject vehicle to perform an optimized autonomous driving in each of regions, comprising:
at least one memory that stores instructions; and at least one processor configured to execute the instructions to perform processes of (I) on condition that (1) a learning device, when one or more K-th training images corresponding to at least one K-th region are acquired, has instructed at least one K-th convolutional layer of a K-th Convolutional Neural Network (CNN) included therein to apply at least one K-th convolution operation to the K-th training images, to thereby generate one or more K-th feature maps for training, (2) the learning device has instructed at least one K-th output layer of the K-th CNN to apply at least one K-th output operation to the K-th feature maps for training, to thereby generate one or more pieces of K-th estimated autonomous driving source information for training, (3) the learning device has instructed at least one K-th loss layer of the K-th CNN to generate at least one K-th loss by using the K-th estimated autonomous driving source information for training and its corresponding K-th Ground-Truth (GT) autonomous driving source information, and then to perform backpropagation by using the K-th loss, to thereby learn at least part of K-th parameters of the K-th CNN, (4) the learning device has stored the K-th CNN in a database after tagging K-th location information of the K-th region to the K-th CNN, wherein the K-th CNN is one of a first CNN to an M-th CNN, and wherein M is an integer larger than 1, and K is an integer from 1 to M, (5) the learning device (i) has acquired information on each of a (K_1)-st CNN to a (K_N)-th CNN, selected among the first CNN to the M-th CNN, corresponding to each of a (K_1)-st region to a (K_N)-th region whose distance from the K-th region is smaller than a first threshold, and then (ii) has calculated similarity scores including a (K_1)-st similarity score between the K-th parameters and (K_1)-st parameters of the (K_1)-st CNN to a (K_N)-th similarity score between the K-th parameters and (K_N)-th parameters of the (K_N)-th CNN; and (6) the learning device has generated a K-th representative CNN corresponding to a K-th extensive region including the K-th region by referring to at least part of (i) one or more specific CNNs, among the (K_1)-st CNN to the (K_N)-th CNN, whose similarity scores are larger than a second threshold and (ii) the K-th CNN, and wherein N is an integer larger than 0, instructing the K-th CNN corresponding to the K-th region including the subject vehicle at a K-th timing to generate K-th estimated autonomous driving source information for testing by using a K-th test image, and (II) instructing an autonomous driving module to perform an autonomous driving of the subject vehicle by referring to the K-th estimated autonomous driving source information for testing.

24. The device of claim 23, wherein, at the process of (I), the processor acquires a K-th representative CNN for a K-th extensive region including the K-th region, and then instructs the K-th representative CNN to generate the K-th estimated autonomous driving source information for testing.

25. The device of claim 23, before performing a process of generating the K-th estimated autonomous driving source information for testing at the process of (I), the processor further performs processes of: (I-1) when the subject vehicle is located in a (K−1)-th region which is adjacent to the K-th region at a (K−1)-th timing which is earlier than the K-th timing, monitoring whether the subject vehicle has moved from a (K−1)_1-st partial region in the (K−1)-th region to a (K−1)_2-nd partial region therein or not, by referring to subject location information acquired from a Global Positioning System (GPS) in the subject vehicle, and (I-2) when a movement of the subject vehicle from the (K−1)_1-th partial region to the (K−1)_2-nd partial region has been detected, acquiring the K-th CNN corresponding to the K-th region where the subject vehicle is to be located at the K-th timing by referring to an estimated route of the subject vehicle.

26. The device of claim 25, wherein, at the process of (I-2), (i) the processor acquires information on the estimated route from the autonomous driving module, when the subject vehicle has been performing the autonomous driving at a timing when the subject vehicle has moved to the (K−1)_2-nd partial region, and (ii) the testing device acquires the information on the estimated route from an Advanced Driving Assistance System (ADAS) in the subject vehicle when the subject vehicle has been performing a semi-autonomous driving at the timing when the subject vehicle has moved to the (K−1)_2-nd partial region and its destination has been inputted to the ADAS.

27. The device of claim 25, wherein, at the process of (I-2), the processor, when the subject vehicle has been performing a manual driving at a timing when the subject vehicle has moved to the (K−1) 2-nd partial region or when the subject vehicle has been performing a semi-autonomous driving but its destination has not been inputted to an ADAS in the subject vehicle, performs an inverse reinforcement learning algorithm by using information on a past route which had been driven by the subject vehicle in a time range from a (K−P)-th timing to the (K−1)-th timing, to thereby acquire the estimated route, wherein P is an integer from 1 to T−1.

28. The device of claim 23, wherein, at the process of (I), the processor, when each of the first to the M-th CNNs is stored in the database with its information, tagged thereto, on each of locations where its corresponding training images have been acquired and each of timings when said its corresponding training images have been acquired, instructs the K-th CNN which corresponds to both of the K-th region and a K-th time range including the K-th timing to generate the K-th estimated autonomous driving source information for testing.

29. A learning method for performing a seamless parameter switch by using a location-specific algorithm selection, to thereby allow a subject vehicle to perform an optimized autonomous driving in each of regions, comprising steps of:
(a) a learning device, when one or more K-th training images corresponding to at least one K-th region are acquired, instructing at least one K-th convolutional layer of a K-th Convolutional Neural Network (CNN) included therein to apply at least one K-th convolution operation to the K-th training images, to thereby generate one or more K-th feature maps;
(b) the learning device instructing at least one K-th output layer of the K-th CNN to apply at least one K-th output operation to the K-th feature maps, to thereby generate one or more pieces of K-th estimated autonomous driving source information;
(c) the learning device instructing at least one K-th loss layer of the K-th CNN to generate at least one K-th loss by using the K-th estimated autonomous driving source information and its corresponding K-th Ground-Truth (GT) autonomous driving source information, and then to perform backpropagation by using the K-th loss, to thereby learn at least part of K-th parameters of the K-th CNN; and
(d) the learning device storing the K-th CNN in a database after tagging K-th location information of the K-th region to the K-th CNN,
wherein the K-th CNN is one of a first CNN to an M-th CNN, and wherein M is an integer larger than 1, and K is an integer from 1 to M,
wherein, at the step of (d), the learning device (i) stores the K-th CNN in the database after tagging the K-th location information along with K-th time information, the K-th time information corresponding to a K-th timing when the K-th training images have been acquired, to the K-th CNN, (ii) acquires information on each of a (K_1)-st CNN to a (K_N)-th CNN, selected among the first CNN to the M-th CNN, corresponding to each of a (K_1)-st timing to a (K_N)-th timing whose differences from the K-th timing are smaller than a third threshold, (iii) calculates similarity scores including a (K_1)-st similarity score between the K-th parameters and (K_1)-st parameters of the (K_1)-st CNN to a (K_N)-th similarity score between the K-th parameters and (K_N)-th parameters of the (K_N)-th CNN, and (iv) generates a K-th representative CNN corresponding to a K-th time range including the K-th timing by referring to at least part of (i) one or more specific CNNs, among the (K_1)-st CNN to the (K_N)-th CNN, whose similarity scores are larger than a fourth threshold and (ii) the K-th CNN.

30. A learning device for performing a seamless parameter switch by using a location-specific algorithm selection, to thereby allow a subject vehicle to perform an optimized autonomous driving in each of regions, comprising:
at least one memory that stores instructions; and
at least one processor configured to execute the instructions to perform processes of: (I) when one or more K-th training images corresponding to at least one K-th region are acquired, instructing at least one K-th convolutional layer of a K-th Convolutional Neural Network (CNN) included therein to apply at least one K-th convolution operation to the K-th training images, to thereby generate one or more K-th feature maps, (II) instructing at least one K-th output layer of the K-th CNN to apply at least one K-th output operation to the K-th feature maps, to thereby generate one or more pieces of K-th estimated autonomous driving source information, (III) instructing at least one K-th loss layer of the K-th CNN to generate at least one K-th loss by using the K-th estimated autonomous driving source information and its corresponding K-th Ground-Truth (GT) autonomous driving source information, and then to perform backpropagation by using the K-th loss, to thereby learn at least part of K-th parameters of the K-th CNN, and (IV) storing the K-th CNN in a database after tagging K-th location information of the K-th region to the K-th CNN, wherein the K-th CNN is one of a first CNN to an M-th CNN, and wherein M is an integer larger than 1, and K is an integer from 1 to M, wherein, at the process of (IV), the processor (i) stores the K-th CNN in the database after tagging the K-th location information along with K-th time information, the K-th time information corresponding to a K-th timing when the K-th training images have been acquired, to the K-th CNN, (ii) acquires information on each of a (K_1)-st CNN to a (K_N)-th CNN, selected among the first CNN to the M-th CNN, corresponding to each of a (K_1)-st timing to a (K_N)-th timing whose differences from the K-th timing are smaller than a third threshold, (iii) calculates similarity scores including a (K_1)-st similarity score between the K-th parameters and (K_1)-st parameters of the (K_1)-st CNN to a (K_N)-th similarity score between the K-th parameters and (K_N)-th parameters of the (K_N)-th CNN, and (iv) generates a K-th representative CNN corresponding to a K-th time range including the K-th timing by referring to at least part of (i) one or more specific CNNs, among the (K_1)-st CNN to the (K_N)-th CNN, whose similarity scores are larger than a fourth threshold and (ii) the K-th CNN.

* * * * *